Sept. 8, 1970   H. J. ORR   3,528,049
DISCONNECT FOR ELECTRIC METERS
Filed May 15, 1968
FIG. 1
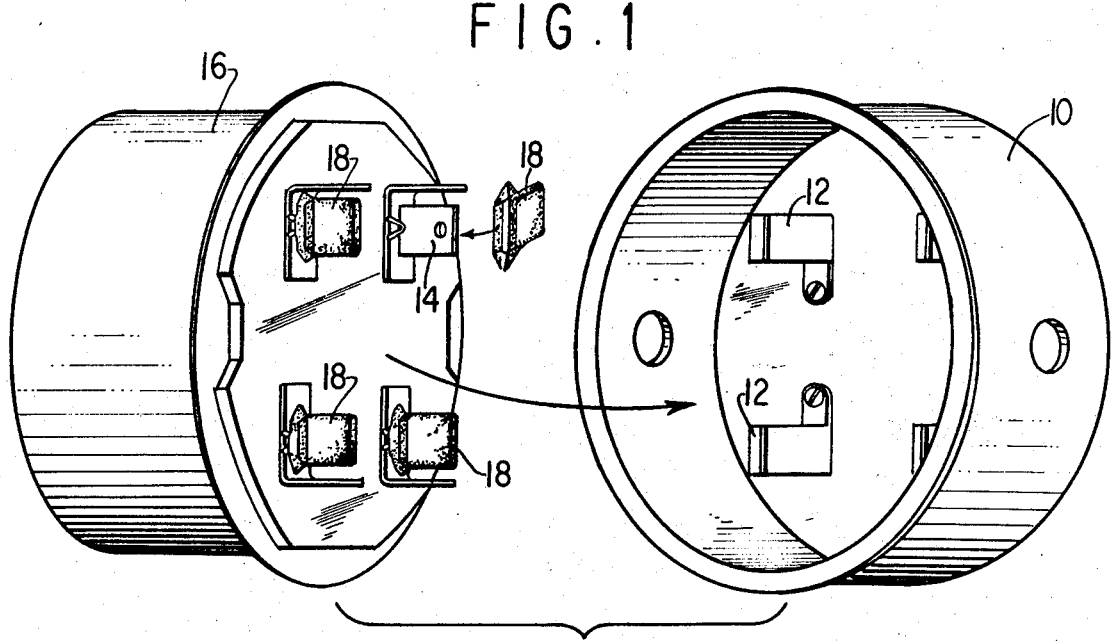
FIG. 2
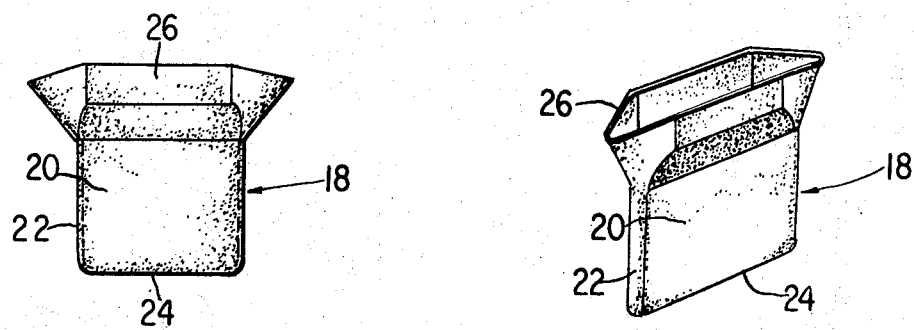
FIG. 3
FIG. 4
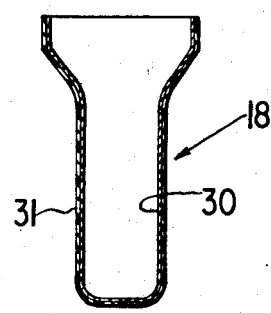
INVENTOR
HARLEY J. ORR.
BY
Smythe & Moore
ATTORNEYS

United States Patent Office 3,528,049
Patented Sept. 8, 1970

3,528,049
DISCONNECT FOR ELECTRIC METERS
Harley J. Orr, Bedford, N.H., assignor to Sola Basic Industries, Inc., Milwaukee, Wis., a corporation of Wisconsin
Filed May 15, 1968, Ser. No. 729,310
Int. Cl. H01r 13/44
U.S. Cl. 339—36                    3 Claims

ABSTRACT OF THE DISCLOSURE

An insulating sheath for the temporary disconnection of electric meters which comprises a sleeve of elastic molded plastic material so formed as to stretch and cling to the blade of a meter upon removal of the meter from its socket.

---

This invention relates to electric meters such as a watt-hour meter and more particularly to an insulating sheath for temporarily disconnecting the blades of such meter from a receiving socket.

More specifically, the present invention is an improvement over the insulating sheath disclosed in copending application Ser. No. 666,273, filed Sept. 8, 1967, and assigned to the same assignee as the present application. While the sheath of this prior application has been found to be satisfactory for universal use on meters of different design, there still remains the difficulty of removing the sheath from the meter socket when continuance of electric service is desired.

An object of the present invention, therefore, is to provide a temporary disconnect for the blades of an electric meter which is readily removable as well as easily applied.

A further object is the provision of an elastic, moldable insulating sheath for the blades of an electric meter which is so formed as to cling to the blade upon removal of the meter from its socket, thereby to provide for ready removal of the sheath.

In its main aspect, the invention comprises a hollow flattened sleeve or tube of elastic insulating material, sealed at one end, and formed tightly to fit the blade of a meter. The unclosed end of the tube or sleeve is provided with an outwardly flaring lip which extends entirely around the periphery of the tube or sleeve and stretches inwardly upon removal of a meter from its socket thereby tightly clinging to the blade of the meter. In order more readily to insert the sheath on a meter blade and assist in the clinging action, the flattened tube may be outwardly flared in a direction normal to as well as transversely of the flattened portion of the tube.

The foregoing and other objects, features and advantages of the invention will be apparent from the following description taken in conjunction with the accompanying drawing which illustrates an exemplary embodiment of the invention.

In the drawing:

FIG. 1 is an exploded perspective view of an electric meter, a meter socket, and a plurality of insulating sheaths formed in accordance with the present invention;

FIG. 2 is a plan view of the insulating sheath;

FIG. 3 is a perspective view of the sheath; and

FIG. 4 is an enlarged sectional view taken transversely of FIGS. 2 and 3 showing an insulating sheath of modified structure.

Referring to the drawing and more particularly to FIG. 1, there is shown a socket 10 having spring jaws or clips 12 adapted to receive the blades 14 of a watt-hour or like electric meter 16. Ordinarily the meter 16 is inserted in the socket 10 with the blades 14 in electric conductivity with the jaw clips 12. Sometimes, however, it is desirable to leave the meter in place with the meter electrically disconnected from the socket. This is accomplished by placing an insulating sheath 18 over each or a plurality of the blades 14, the sheath being sufficiently thin so as not to unduly stress the jaw clips 12.

As more particularly shown in FIGS. 2 and 3, the sheath 18 comprises a flattened tubular member or sleeve 20 having closed sides 22 and a closed bottom 24. Extending upwardly at the open end of the tubular member of sleeve 20 and integrally attached thereto, is an outwardly flaring lip 26 which extends continuously around the periphery of the sleeve and flares outwardly in a direction both normal to and transversely of the flattened sides of the sheath. This flared lips serves a double purpose. It not only permits ready placement of the sheath on a meter blade but also stretches into clinging relationship with the blade upon removal of the meter from the socket as hereinafter more fully described.

The tubular or sleeve member 20 is made from an elastic and stretchable moldable plastic insulating material, such as "Mylar," the trademark of Du Pont for its polyester film, and has relatively thin side walls, in the order of .010–.015 inch for example, so as not to unduly stress the spring jaw clips 12 when in place. The interior dimensions of the sleeve or sheath are such as to tightly hug the flat sides of a meter blade while having sufficient width to accommodate blades of different sizes. Upon withdrawal of the meter from its socket, the outwardly flared lip 26 is stretched inwardly so as to tightly cling to the blade of the meter and be with drawn from the base socket therewith.

FIG. 4 illustrates a modified form of the invention in which the sheath 18 comprises a two-ply material consisting of an inner sealed sleeve of reinforcement material 30 and an outer covering of a rubber-like elastomer 31. The elastomer 31 is strongly bonded to the reinforcing material 30 such as by the application of heat and pressure to provide a total wall thickness of approximately .0008 inch. One method of making the sheath of FIG. 4 is to form the inner sleeve-like reinforcing member 30 by a punch and die draw operation and thereafter to mold the elastomer material 31 onto and into the reinforcing material by the application of heat and pressure as aforesaid. Merely as an example, the reinforcement member 30 may be of "Dacron," the trademark of Du Pont for its polyester fiber, or nylon.

The elastomer 31 may be silicone rubber, polyacrylate, vinyl or "Vitron," the trademark of Johns-Manville for its fiber glass roving.

While exemplary embodiments of the invention have been shown and described, it will be understood that alterations, changes and modifications may be made without departing from the spirit of the invention.

What is claimed is:

1. In an electric meter assembly wherein a meter and base have interconnecting blades and sockets, a sheath for temporarily disconnecting said meter comprising a flat thin-walled tubular sleeve closed at its side and bottom edges and adapted to fit over a blade of said meter, said sleeve being formed from an elastic and stretchable moldable insulating material and having an integral lip portion extending continuously around the periphery of said tubular sleeve at its open end, said lip being so formed as to flare outwardly both normal to and transversely of its flattened portion and be stretched inwardly into clinging engagement with the associated blade upon withdrawal of the meter from the base.

2. A disconnecting sheath as defined in claim 1 in which said tubular sleeve is molded from an elastomeric material.

3. A disconnecting sheath as defined in claim 1 in which said sleeve has a two-ply construction consisting of a rubber-like elastomer material bonded to a ply of reinforcing.

References Cited

UNITED STATES PATENTS

| 916,435 | 3/1909 | Gould | 339—26 |
|---|---|---|---|
| 1,850,583 | 3/1932 | Gage | 339—156 |
| 2,506,615 | 5/1950 | Rosen | 200—51.07 |
| 2,557,928 | 6/1951 | Atkinson | 174—18 |
| 2,643,362 | 6/1953 | Johansson | 339—36 |

RICHARD E. MOORE, Primary Examiner

J. H. McGLYNN, Assistant Examiner

U.S. Cl. X.R.

339—278

UNITED STATES PATENT OFFICE
CERTIFICATE OF CORRECTION

Patent No. 3,528,049      Dated September 8, 1970

Inventor(s) Harley J. Orr

It is certified that error appears in the above-identified patent and that said Letters Patent are hereby corrected as shown below:

Column 2, line 14, "lips" should be --lip--; Column 2, line 30, "with drawn" should be --withdrawn--; Column 3, line 2, insert "material" after "reinforcing".

SIGNED AND
SEALED
JAN 5 1971

(SEAL)
Attest:

Edward M. Fletcher, Jr.
Attesting Officer

WILLIAM E. SCHUYLER, JR.
Commissioner of Patents